Nov. 9, 1965 L. R. SMITH 3,217,300

MULTI-APERTURED MAGNETIC LOGIC DEVICE

Filed May 11, 1961 3 Sheets-Sheet 1

INVENTOR.
LAWRENCE R. SMITH
BY Mueller & Aichele

Nov. 9, 1965 L. R. SMITH 3,217,300

MULTI-APERTURED MAGNETIC LOGIC DEVICE

Filed May 11, 1961 3 Sheets-Sheet 2

INVENTOR.
LAWRENCE R. SMITH
BY Mueller & Aichele

MULTI-APERTURED MAGNETIC LOGIC DEVICE

Filed May 11, 1961

INVENTOR.
LAWRENCE R. SMITH
BY Mueller & Aichele 3,217,300

MULTI-APERTURED MAGNETIC LOGIC DEVICE

Lawrence R. Smith, Phoenix, Ariz., assignor to Motorola, Inc., Chicago, Ill., a corporation of Illinois Filed May 11, 1961, Ser. No. 109,440
15 Claims. (Cl. 340—174)

This invention relates generally to magnetic devices and systems, and more particularly to multi-aperture core devices and circuits employing them for the purpose of storing and transferring binary information.

Magnetic multi-aperture devices, as they are known in the art at the present time, include as the fundamental element a core of magnetic material which has relatively high retentivity properties, such as ferrite. In one of the simplest forms of such cores, there is a major aperture in the core which defines a closed-loop flux path, and there is at least one minor aperture in the core which divides the flux path just referred to into branches. The core provides additional closed-loop flux paths about the minor apertures which include portions of the branches of the major flux path. The essential distinction between a major aperture and a minor aperture as these terms are used herein, and in the art, is that the minor apertures are smaller, and the flux path about a minor aperture is considerably shorter than the flux path about a major aperture. The core is linked by windings including an input winding and output winding, and the minor apertures serve to isolate the windings from each other.

Although the usefulness of such multi-aperture core devices for storage and logic applications has been generally recognized, they have had some drawbacks which have held back widespread commercial application of them. One of the most serious problems has been that the proper functioning of multi-aperture magnetic devices has been dependent to a critical degree on the so-called threshold characteristics of the magnetic material. It has been difficult and costly to provide magnetic materials which have proper threshold characteristics and which can be fabricated into multi-aperture cores with a high degree of product uniformity and reliability. The threshold characteristics of magnetic materials for cores, and the problems connected with them, will be discussed further herein.

In many applications for multi-aperture core devices, signals representing information which is coded in binary form are stored and transferred by the core devices. The binary elements of information are usually designated "binary one" and "binary zero." In magnetic systems which are designed to perform logic functions which can be described by Boolean algebra, signals representing binary one and binary zero are of equal importance. Known multi-aperture cores supply an output signal representing one binary element, say binary one for example, but no such core device has been available which supplies two distinguishable output signals to represent both binary one and binary zero. The binary zero information has usually been represented by the absence of an output from the multi-aperture core device, and when a signal representing this function is required in a system, it has been necessary to derive it by additional circuitry. Although this can be done effectively, it would be more desirable to have a core device which supplies two distinguishable signals. Such signals will be designated "true" and "complement" signals herein, since one is the complement of the other, and a device for storing and transferring such signals will be called a "true and complement" device.

It is an object of the invention to reduce the dependency of multi-aperture core devices on the specific threshold characteristics of the magnetic material from which they are made.

Another object of the invention is to provide a multi-aperture core element which is capable of storing and transferring signals which represent both binary one and binary zero information.

A further object is to provide a core element which will not require strict tolerances on clocking current amplitude and waveform and this will simplify the clocking circuitry.

A feature of the invention is a multi-aperture magnetic device which provides output signals that depend on the net amount of flux that is switched at two output portions of the device such that the device is characterized by a high signal-to-noise ratio. The effect of spurious flux-switching is minimized, and therefore the importance of having magnetic material which has clearly defined switching thresholds about the major and minor apertures of the device is reduced. This means that magnetic materials which are readily available and economical may be used in fabricating the device while still maintaining commercially acceptable standards of product uniformity and reliability.

Another feature of the invention is the provision of a magnetic core device which is divided into two distinct portions, each having input and output apertures, such that one portion is adapted to store and transfer binary one information in the form of signals and the other portion is adapted to store and transfer binary zero information in the form of signals.

Still another feature is the provision of a magnetic logic device including at least one multi-aperture core element with an output winding arranged such that one element of information is represented by current in one direction in the output winding and another element of information is represented by current in the opposite direction in the output winding. The absence of current in the output winding may represent a third element of information, so the device can be operated in a two-level mode or a three- level mode.

The invention is illustrated in the accompanying drawings in which.

A true and complement magnetic device in accordance with the invention includes magnetic material which forms two major closed-loop flux paths, each of which is adapted to store and transfer binary information in the form of signals. The two flux paths may be in a single core or in separate cores, but in both cases the device has a true section and a complement section. Signals representing binary one may be stored by one section of the device, and signals representing binary zero may be stored by the other section. The true and complement device is useful in many storage and logic applications such as shift registers, counters and gates to mention a few, and it is particularly useful in the implementation of switching or logical functions which can be expressed by Boolean algebra.

Each section of the device has an output aperture in the magnetic material which divides the respective major flux path into branches, and each section may also have an input aperture if desired. The input and output apertures are linked by respective windings, and the magnetic material serves to transfer signals from the input winding to the output winding. The information represented by the input signals is stored in the form of flux in the magnetic material during this transfer process.

One of the most significant advantages of the true and complement device is that it is not adversely affected by so called noise flux which may be switched in the magnetic material. This is accomplished by providing an output winding which passes through the two output apertures in opposite directions and links the minor flux paths about those apertures in an opposed relation. An output representing binary one is in the form of current in one direction in the output winding, and this current is produced when more flux is switched about the "one" output aperture than about the "zero" output aperture. An output representing binary zero information is in the form of current in the opposite direction in the output winding, and it follows that this output is produced when more flux is switched about the "zero" output aperture than about the "one" output aperture. Thus, the binary operation of the device does not rely upon flux either being switched or not switched as is the case with devices of the prior art, but rather relies on the amount of flux that is switched at two output apertures.

Figure 1:
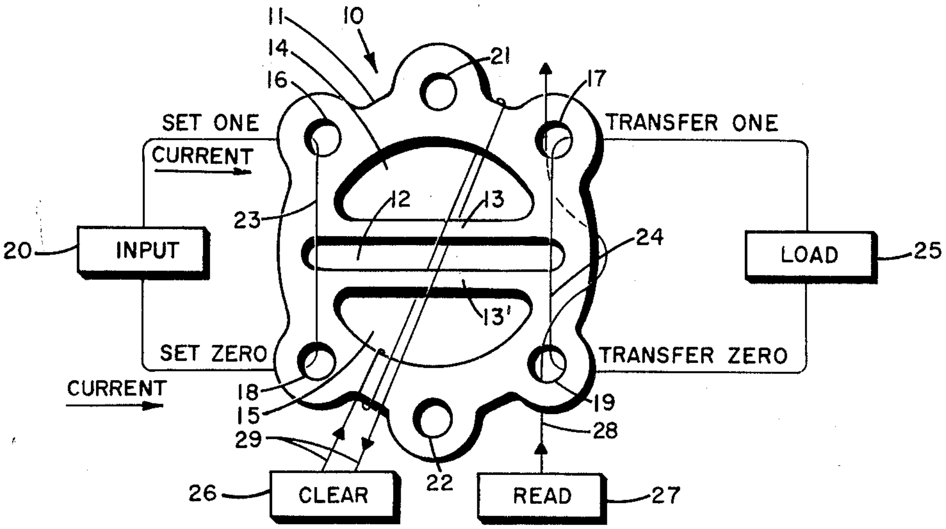
FIG. 1 shows a true and complement magnetic device in accordance with the invention including a core element and windings for magnetically exciting the core.
Figure 6:
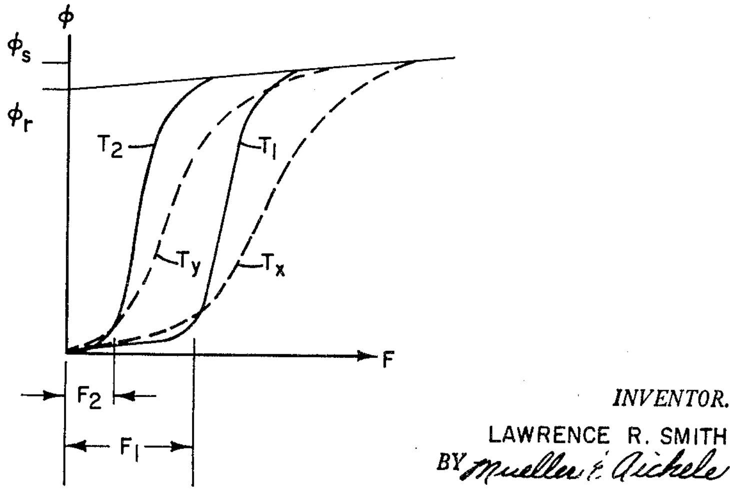
FIG. 6 is a plot of flux density versus magnetomotive force for the magnetic material of the core of FIG. 1.

A typical true and complement magnetic device in accordance with the invention is illustrated in FIG. 1. The device 10 includes a core 11 of magnetic material which has a generally square or rectangular hysteresis loop. The hysteresis characteristics of the material are illustrated in FIG. 6 which will be described later. It may be seen in FIG. 1 that the upper and lower halves of the core 11 are symmetrical, and the two halves of the core are rendered distinct sections by an elongated aperture 12 which forms two central legs or arms, 13 and 13'. The upper and lower halves of the core as viewed in FIG. 1 will be referred to as the true and complement sections respectively, although it will be recognized that true signals may be stored and transferred by either half of the core and complement signals will be stored and transferred by the other half. It is not essential that the two sections of the core be symmetrical.

There are two major apertures 14 and 15, with the aperture 14 being in the true section and the aperture 15 being in the complement section. These major apertures define the major flux paths which are illustrated schematically by arrows in FIG. 2. The smaller apertures which are spaced about the annular portion of the core 11 divide the major flux paths into branches or legs, and there is a minor flux path about each of the smaller apertures. The apertures 16 and 17 are the input and output apertures respectively for the true section of the core, and the apertures 18 and 19 are the input and output apertures respectively for the complement section of the core. The other two minor apertures 21 and 22 may be used as either input or output opertures as desired, or they may be omitted. Also, more minor apertures may be provided if desired.

The input winding 23 for the core passes through the two input apertures 16 and 18 in opposite directions, and binary information is set into the core by providing current in this winding in one direction or the other. In order to set a binary one into the core, current is supplied from the input current source 20 and flows in the clockwise direction through winding 23. Current in this direction in winding 23 will be referred to as positive current. Conversely, to set a binary zero into the core, the input current is in the counterclockwise direction in the same path and will be referred to as negative current.

The output winding 24 passes through the two output apertures 17 and 19 in opposite directions and links the flux paths about those apertures in series-opposition relation. The output current is in one direction or the other in this winding depending upon which of the two output apertures has the most flux switched about it. Specifically, if flux is switched about the aperture 17 and not about the aperture 19, the induced field in winding 24 will produce a current flow in the clockwise direction through the winding 24 and the load 25. Current in this direction in winding 24 will be identified as positive current, and it provides the binary one output. Output current in the counterclockwise or negative direction in winding 24 represents a binary zero and is produced by the switching of flux about aperture 19. The switching of flux about the output apertures is produced by supplying current from the read current source 27 through read winding 28 in the embodiment illustrated in FIG. 1, but this reading function may be accomplished in any of several ways, one of which will be described later. The core may be cleared by supplying current form the clear current source 26 through the clear current winding 29, as will be further explained.

Figure 2:
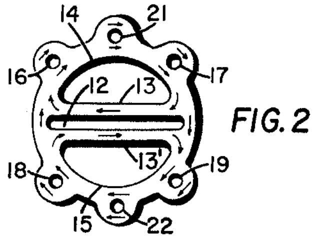
FIG. 2 is a simplified diagram showing the flux pattern in the core of FIG. 1 when it is in the cleared or blocked condition.
Figure 3:
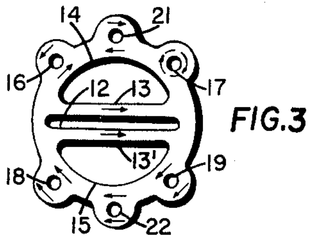
FIG. 3 is another simplified diagram showing the flux pattern when a binary one has been set into the core.
Figure 4:
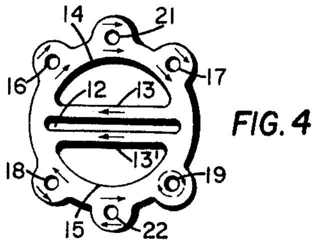
FIG. 4 is a simplified diagram showing the flux pattern when a binary zero has been set into the core.
Figure 5:
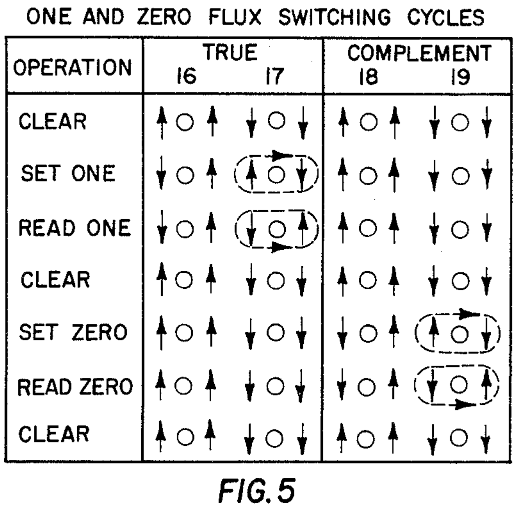
FIG. 5 is a table illustrating the operating cycle for successively transferring a signal representing binary one and then a signal representing binary zero through the core of FIG. 1.

The flux patterns involved in storing and transferring binary information in the core 11 will be described with reference to FIGS. 1, 2, 3 and 4, and successive one and zero operating cycles are illustrated schematically in FIG. 5. The flux pattern illustrated in FIG. 2 represents the clear or blocked condition of the core. It may be seen by the arrows that flux is continuous in the clockwise direction about the major flux path formed by the upper or true section of the core, and flux is also continuous in the clockwise direction about the major flux path formed by the lower or complement section of the core. When a binary one is set into the core by positive current in the winding 23, the flux pattern illustrated in FIG. 3 is produced. The positive input current reverses flux in the outer leg adjacent aperture 16 and also reverses flux in the inner legs at apertures 17 and 21, and in the upper leg 13 at aperture 12. The positive input current cannot switch flux in the complement section of the core because that section is already saturated in the direction of the applied field. The result of the positive input current is that flux is continuous in a clockwise sense about the output aperture 17 as shown in FIG. 3.

Current in the read winding 28 is of sufficient amplitude to switch flux about aperture 17 as indicated by the dotted line about that aperture, but is not of sufficient amplitude to switch flux about aperture 19 as will be explained later. This results in an output current in winding 24 which is in the same direction as the input current which previously flowed in winding 23, and thus the binary one signal has been transferred from the input winding 23 to the output winding 24.

The core may be returned to the clear condition as illustrated in FIG. 2 by applying current through the clear winding 29 which links the annular portion of the core in both the true and complement sections, and also links the upper and lower legs 13 and 13' at aperture 12. The direction of this current is indicated by the arrows in FIG. 1.

In order to transfer a signal representing binary zero from winding 23 to winding 24, the sequence of operation is the same as just described in connection with transferring a binary one, but the switching of flux takes place in the complement section of the core. The zero input is provided by negative current in the winding 23, and this current switches flux about the major aperture 15 producing the pattern shown in FIG. 4. After the binary zero has been set into the core, flux is continuous in a clockwise sense about the output aperture 19. This flux is reversed to produce the zero output by applying current through the read winding 28, and the result is a negative current in winding 24. The core is returned to the cleared condition by current in the winding 29 in the direction of the arrows shown in FIG. 1.

The amplitude of the input current in winding 23 must be sufficient to exceed the switching threshold of the major flux paths about apertures 14 and 15. The cure identified $T_1$ in FIG. 6 is characteristic of the switching of flux about either of the major apertures. The read current in winding 28 is amplitude limited so as to exceed the switching threshold of the minor flux paths about the output apertures 17 and 19 but not to exceed the switching threshold of the major flux paths about the larger apertures. The curves identified $T_2$ in FIG. 6 is characteristic of the switching of flux about any of the minor apertures such as the output apertures 17 and 19. The knee of curve $T_1$ which occurs at a level of magnetomotive force identified as $F_1$ is the threshold region beyond which most of the flux switching about the major aperture occurs. Similarly, the knee of curve $T_2$ at force $F_2$ is the threshold region for flux switching about the output apertures. Ideally, the knees of the two curves at the threshold regions would be sharp and distinct.

However, in a practical element the threshold regions may not be sharply defined, and in fact the two characteristic curves may deviate from the desired shape to the extent represented by the dotted line curves labelled $T_X$ and $T_Y$ in FIG. 6. These dotted line curves do not have distinct threshold regions, and it may be seen from the relatively great slope of these curves and their overlapping relationship that the switching of flux about one of the small apertures will be accompanied by some flux switching about one of the major apertures. This would obviously interfere with proper operation of prior art multi-aperture devices where well defined and well separated threshold characteristics are critical. However, the device of FIG. 1 will accommodate relatively poorly defined threshold characteristics because successful operation of the device relies only upon a net difference in the flux switched about the two output apertures.

Figure 7:
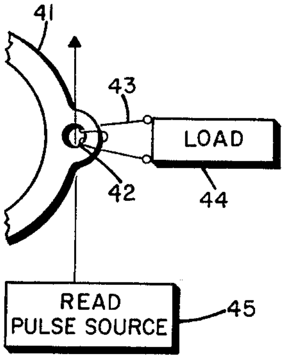
FIG. 7 shows a fragmentary portion of a core which will be described in explaining the problems of spurious flux-switching in magnetic devices.

The differential action of the true and complement core of FIG. 1 will be compared to the action of a core which relies on the presence or absence of flux switching about an output aperture, and certain advantages of the true and complement core will be pointed out. FIG. 7 shows a portion of a core 41 which has an output aperture 42 linked by a winding 43. Only a fragmentary portion of the core is shown because it is in this portion that the flux switching of interest takes place. Output current in the winding 43 is produced by switching flux about aperture 42, and this current represents a binary one output. Binary zero is represented by the absence of flux switching about aperture 42 when the core is excited for the purpose of transferring information to the load 44, which may be another core. If no flux is switched at read time, there is no current (or no enhancement of current) in the output winding 43.

However, if some spurious flux switching takes place about aperture 42 at read zero time, there will be some output current. Even though the core 41 would be nominally saturated with flux at read zero time, some flux may be switched when the core is excited because the remanence flux level $\phi_r$ is somewhat lower than the saturation flux level $\phi_s$ as shown in FIG. 6, and also because of the lack of a well defined switching threshold ($F_1$ of FIG. 6). Usually the coupling between the core 41 and a succeeding core which forms the load 44 is such as to provide flux gain, and the gain amplifies the effect of the spurious flux switching. Flux gain occurs when the change of flux in the core which forms the load is greater than the change of flux in the driver core. If there is a series of cores, as is typical in a counter or shift register, spurious flux switching in a given core will be amplified in succeeding cores to the point where erroneous information may be set into the system. In other words, the signal-to-noise ratio approaches unity when the noise is amplified in successive cores.

Figure 8:
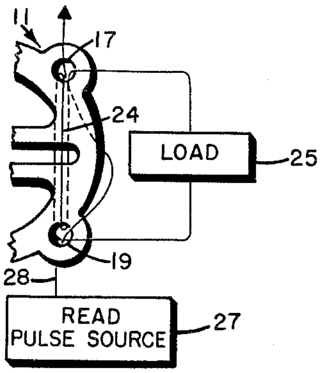
FIG. 8 shows a portion of the core of FIG. 1 and will be described in explaining how spurious flux-switching in this core does not adversely affect the operation of the device.

The true and complement core of FIG. 1 is unresponsive to spurious flux switchings such that a high signal-to-noise ratio is maintained. As shown in FIG. 1, and also in FIG. 8, the output winding 24 is actually wound about the material between the two apertures 17 and 19. Therefore, any flux which is switched about the large apertures 14 and 15 via the inner legs of either of the output aperture 17 and 19, or via the outer legs of both output apertures, does not link the output winding 24 and will not induce fields in that winding. As a result, the winding 24 may have enough turns to assure ample flux gain without degrading the signal-to-noise ratio.

For most applications of the true and complement core device, the two level mode of operation is employed wherein either a binary one or a binary zero is set into the core in each operating cycle. Thus, just prior to read time, flux is continuous about one or the other of the output apertures 17 and 19. At read time (which may also be considered transfer time) more flux will be switched about one output aperture than the other, and an output current is produced which is of sufficient amplitude to switch flux in a succeeding core. The polarity of the output current depends on which of the output apertures has the most flux switched about it. In the above description, positive output current has been identified with binary one, but the positive current could represent binary zero with negative current representing binary one. Also, the output from the core 11 may be inverted in a succeeding core if desired.

The device of FIG. 1 can be operated in a three level mode if desired. In this mode, current in one direction in th windings 23 and 24 represents a first element of information, current in the opposite direction represents a second element of information, and the absence of current represents a third element of information. The outputs corresponding to the first and second elements depend on the difference in the flux switched at the two output apertures. The third element relies on the absence of flux switching, but noise causes no problems since spurious flux switching due to imperfect retentivity properties of the core material does not link the output winding 24.

Figure 9:
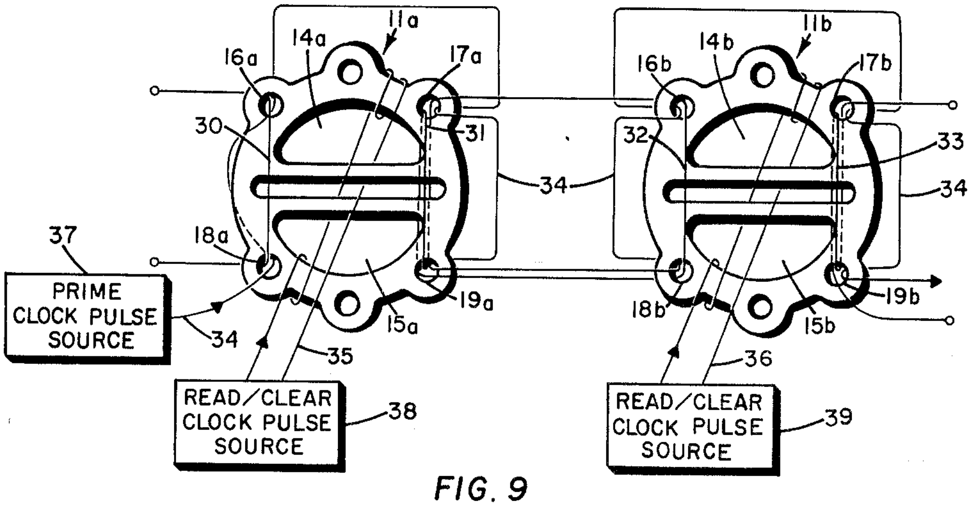
FIG. 9 shows two of the true and complement cores of FIG. 1 in a shift register connection.

FIG. 9 illustrates one stage of a two core per bit shift register which is implemented with the true and complement cores of the invention. It may be seen that the core elements **11*a* and 11*b* in FIG. 9 are identical to the core 11** of FIG. 1, and therefore the same reference numerals are used except that the *a* and *b* designations are added to distinguish the two cores from each other. The windings for the core are somewhat different than those shown in FIGI. 1, so different reference numbers have been applied to them. The output winding 31 of the core **11*a* is connected to the input winding 32 of the core 11*b* to form a transfer loop. The core 11*a* has an input winding 30 which is connected to a previous stage, and the core 11*b* has an output winding 33 which may be connected to a following stage. Only one stage is shown because the other stages are identical. In addition to the input and output windings, there is a priming circuit 34 which passes through the minor apertures of the cores. Each of the cores has a blocking winding which receives clock pulses. The blocking windings are identified 35 and 36**.

The operating cycle will be described assuming that a binary one signal which will produce positive current in the input winding 30 of the core 11*a* is available from a previous stage. The output from the preceding stage in the form of positive current in winding 30 sets a binary one into the core 11 in the manner described above in connection with FIG. 1. Next, a clock pulse is applied from the pulse source 37 to the priming circuit 34 which reverses flux about the output aperture 17*a*. This pulse is amplitude limited so that it does not exceed the threshold of the major flux paths in the cores. Thus, although the flux reversal at aperture 17*a* produces current in winding 31, this current does not affect core 11*b* because it cannot switch flux in that core. Then a pulse is applied from the pulse source 38 to the blocking winding 35 which returns core 11*a* to the clear condition, and this switches flux at aperture 17*a* which is linked by the output winding 31 such that current flows in the winding 31 in the positive direction. The positive current is of sufficient magnitude to switch flux about the major flux path in the upper half of core 11*b*. Thus, the binary one has been shifted to core 11*b*. Current is again applied to the priming circuit, and then a clock pulse is applied from the pulse source 39 to the blocking winding 36 which produces current in the output winding 33 in the positive direction. This output current will transfer the binary one information to a succeeding stage.

The operation of the true and complement core as just described is slightly different than that described in connection with FIGS. 1 to 5, although the principles are the same. In the circuit of FIG. 9, the transfer of flux is accomplished by energizing the circuits 35 and 36 and the read pulse of FIG. 1 is used as priming in FIG. 8 to reverse the flux state so that the flux reversal at transfer time will link the output winding. It is advantageous to transfer flux by means of current in the windings 35 and 36 because the amplitude of this current need not be limited and therefore ample output power is available.

In the shift register described above, it may be seen that the clock pulses for the two windings 35 and 36 and for the priming circuit 34 always have a constant load. This is because each true and complement core is always set by current in one or the other direction in its input winding so that a binary one or a binary zero is always present in each core at the time of the clock pulses. Consequently, the generator circuits from which the clock pulses are supplied may be in the form of voltage switches. If the cores of a register do not present a constant load to clock pulses, as is true of prior art registers using multi-aperture cores, it is necessary to use constant-current clock generators which are considerably more expensive and require much more power than a simple voltage switch.

The winding 31 links the flux paths about apertures 17*a* and 19*a* in series-opposition relation, and likewise the winding 33 links the flux paths about apertures 17*b* and 19*b* in series-opposition relation. As mentioned above, the prime current is amplitude limited so that it should not exceed the switching threshold of the paths about the larger apertures of cores 11*a* and 11*b*. However, if the prime current becomes too large, say because of variations in supply voltages, it could switch some flux about the output aperture which is not set, as well as reversing flux about the output aperture which is set. For example, if prior to priming there is continuous flux about aperture 17*a* and discontinuous flux about aperture 19*a*, excessive prime current will switch some flux about aperture 19*a* as well as reversing flux about aperture 17*a*. However, so long as the subsequent blocking pulse on winding 35 switches considerably more flux about aperture 17*a* than about aperture 19*a*, a binary one output will be transferred to core 11*b*. Flux gain is achieved by having more turns in winding 31 than in winding 32, and this gain offsets whatever flux may be lost by the subtraction effect due to flux being switched at both of the output apertures 17*a* and 19*a*. An increase in supply voltage also tends to increase the flux gain, and this further offsets the subtraction effect. Thus, the gain helps to maintain adequate signal-to-noise ratio rather than degrading the signal-to-noise ratio as is the case when spurious flux switching occurs in the core of FIG. 7. Any spurious flux switching in the cores of FIG. 9 which is due to imperfect retentivity properties of the core material does not link the output windings 31 and 34, and therefore does not adversely affect the operation of the cores as has been explained previously.

Similarly, the true and complement device is less sensitive to environmental temperature variations than a core of the type shown in FIG. 7. An increase of temperature may mean that the net amount of flux switched in the true and complement core at transfer time is reduced somewhat, but this is offset by flux gain between cores. On the other hand, an increase in temperature can cause spurious flux switching in core 41 which is adversely magnified by flux gain between cores.

Figure 10:
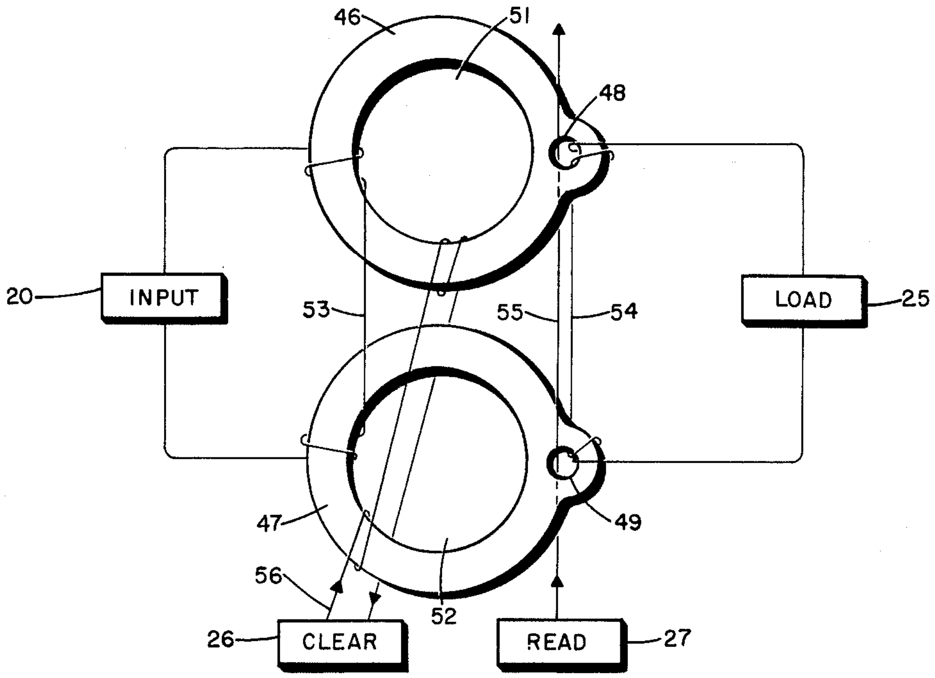
FIG. 10 illustrates another embodiment of the invention which has two multi-aperture cores forming a true and complement device rather than a single core as in FIG. 1.

FIG. 10 illustrates a true and complement device which forms another embodiment of the invention. This device is similar to the one shown in FIG. 1, but two cores 46 and 47 are employed rather than a single core. The cores are annular, and thus they form two major closed-loop flux paths, one in each core. There is one output aperture 48 in core 46 and another output aperture 49 in core 47. These apertures form minor closed-loop flux paths in the material surrounding them which are shorter than the major flux paths around the larger apertures 51 and 52. An input winding 53 passes around the annular portions of the two cores in opposite directions, and thus links the two major flux paths in opposed relation. An output winding 54 passes through the two output apertures 48 and 49 in opposite directions and thus links the two minor flux paths in opposing relation. Current in the input winding 53 is in one direction for a binary one input and is in the opposite direction for a binary zero input. The input current will make flux continuous about one of the output apetures, and this flux is reversed to provide output current in winding 54. The direction of the output current depends on which of the apertures 48 and 49 has the most flux switched about it. Flux is reversed at the output apertures by applying current to a read winding 55 which operates in the same manner as the read winding 28 of FIG. 1. A clearing or blocking winding 56 is energized to establish the two cores in a reference state in which flux is continuous about the two large apertures 51 and 52 and discontinuous about the two output apertures 48 and 49.

One difference between the device of FIG. 10 and that of FIG. 1 is that the output winding 54 of FIG. 10 cancels spurious flux switchings at the output apertures 48 and 49, whereas the output winding 24 of FIG. 1 is not linked by spurious flux switchings as fully described above. Because of this, it is desirable for the two cores 46 and 47 to be matched; that is, they should be made of the same material and have the same hysteresis properties. The single core embodiment of FIG. 1 is advantageous because it is all made of the same material, so matching is no problem, and also because it is simpler and less costly to provide a logic device with a single core rather than two cores.

Another difference between these two embodiments is that in the device of FIG. 10 there is no isolation between the input winding 53 and the clear winding 56, whereas in the device of FIG. 1 the input apertures 16 and 18 effectively isolate the input winding 23 from the clear winding 29. It will be understood, that input apertures may be provided in the two cores 46 and 47 to provide such isolation if desired.

The core 11 of FIG. 1 may be operated in a negation mode, and an example of such a device is shown in FIG.

Figure 11:
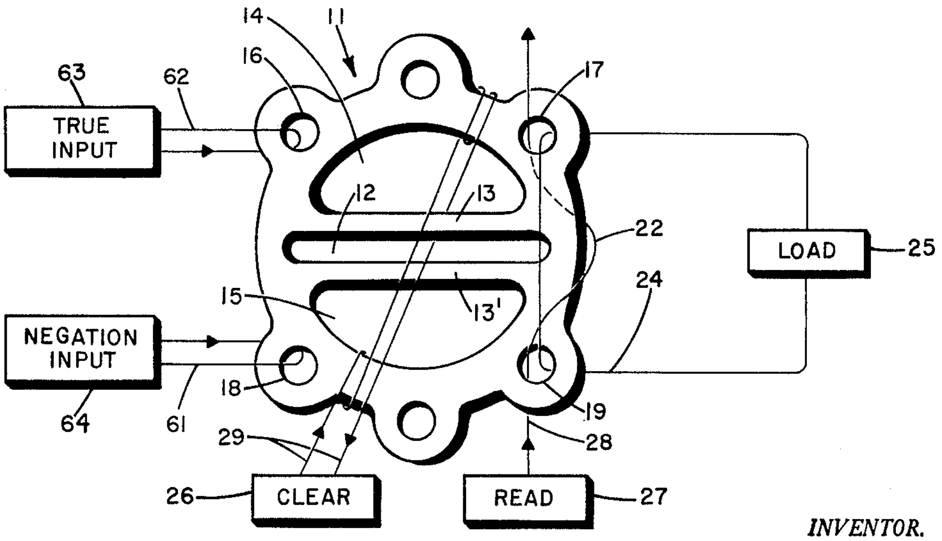
FIG. 11 shows the core element of FIG. 1 arranged to perform a negative function.

11. Separate input windings 61 and 62 are provided for the two input apertures 16 and 18. The other windings are identical to those shown in FIG. 1, and therefore the same reference numbers have been applied to them. If a pulse of current is supplied from the current source 63 to the input winding 62, an output current will be produced in winding 24 when the core is read by energizing the read winding 28. However, if a pulse of current is also applied from the current source 64 to the other input winding 61 prior to read time, no output current will be produced at read time because the flux reversed by energizing the read winding 28 will not link the output winding 24. It will be understood that the device of FIG. 10 may be operated in a negation mode in the same manner as just described in connection with FIG. 11.

Thus, the true and complement device of the invention has many applications, and it has several rather significant advantages. Its proper functioning is considerably less dependent on the threshold characteristics of magnetic material than known multi-aperture core devices. As a result, it can operate reliably over a wider range of temperature, and does not require strict tolerances on the amplitude and waveform of clock pulses. It provides storage and transfer of both true and complement signals which simplifies the implementation of switching and logical functions. The device presents a constant load to clock pulses which makes it possible to simplify the clock pulse generating circuits. The configuration of the core element is straightforward, and it can be fabricated economically with a high degree of product uniformity and reliability.

I claim:

1. A true and complement magnetic logic device comprising a core of magnetic material which has relatively high flux retentivity properties, said core having a configuration providing two major closed-loop flux paths therein which flux paths are effectively magnetically isolated from each other, said core having at least first and second apertures in each of said major flux paths dividing said major flux paths into branches, with the magnetic material of said core forming a minor closed-loop flux path individual to and about each said aperture, blocking winding means linking said major flux paths and adapted to establish continuous flux about the same, input winding means linking the minor flux paths about said first apertures in opposed relation for exciting said core with magnetizing current in either direction to thereby switch flux selectively in a branch of either of said major flux paths depending on the direction of such magnetizing current so as to direct flux about said second apertures selectively, means for reversing such flux about said second apertures, and output winding means linking the minor flux paths about said second apertures in opposed relation for providing an output current therein in response to a switching of flux linked by the same, with the direction of such output current depending on which of said minor flux paths at said second apertures predominates in the switching of flux linked by said output winding means.

2. A magnetic device capable of storing two levels of information represented by first and second input signals, and of transferring such information in the form of first and second output singals of opposite polarity, with the condition where input and output signals are absent being avialable to represent a third level of information, said magnetic device comprising core means of magnetic material having relatively high flux retentivity, said core means including two core sections with each section having a major aperture therein defining a relatively long closed flux path and with each section further having a minor aperture therein dividing the respective long flux path into branches and defining another closed flux path that is shorter than such long flux path, blocking circuit means including winding portions respectively linking each of said long flux paths and adapted when energized to establish continuous flux about the same, input circuit means independent of said blocking circuit means including winding portions respectively about at least part of each of said long flux paths and each adapted to establish continuous flux selectively about the minor aperture in the associated long flux path, circuit means including a winding portion passing through each of said minor apertures for reversing flux locally about said apertures, and an output circuit including a winding portion passing through each of said minor apertures and linking said short flux paths in a sense to provide output signals when said device is operated which depend upon a net amount of flux being switched at either of said minor apertures.

3. A magnetic device including in combination a core of magnetic material having relatively high flux retentivity, said core including two core sections with each section having a major aperture therein defining a relatively long closed flux path and with each section further having first and second minor apertures therein defining shorter flux paths, an input winding passing through said first minor apertures in opposite directions to link the flux paths thereof in an opposed sense, an output winding passing through said second minor apertures in opposite directions to link the flux paths thereof in an opposed sense, winding means linking each of said long flux paths for establishing continuous flux about the same, and a further winding passing through said second apertures in the same sense, said input winding being adapted to set flux selectively about said minor apertures responsive to input signals of opposite polarity, and said further winding being adapted to reverse flux locally about said second minor apertures.

4. A magnetic device for producing opposite polarity signals in an output circuit in response to opposite polarity signals in an input circuit, said device including in combination a core of magnetic material having relatively high flux retentivity, said core including two sections merging at a common region, with each said section having a major aperture therein and with each section further having an input aperture and an output aperture therein about the corresponding major aperture, an input winding passing through said input apertures, an output winding passing through said output apertures and linking the material about the same in a sense to provide voltage cancellation in said output winding in the operation of said device, said input winding being adapted to establish continuous flux selectively about either of said output apertures depending upon the polarity of an input signal applied thereto, a further winding passing through said output apertures in a sense to reverse flux locally about the same, and circuit means for clearing said core to establish continuous flux about said core sections.

5. A magnetic device capable of storing two levels of information represented by first and second input signals, and of transferring said information in the form of first and second output signals of opposite polarity, with the condition where input and output signals are absent being available to represent a third level of information, said magnetic device comprising core means of magnetic material having relatively high flux retentivity, said core means including two separate cores each having a major aperture therein defining a relatively long closed flux path, and with each said core further having a minor aperture therein dividing the respective long flux path into branches and defining another closed flux path that is shorter than the associated long flux path, blocking circuit means including winding means linking each of said long flux paths and adapted when energized to establish continuous flux about the same, input circuit means independent of said blocking circuit means including winding portions respectively about at least part of each of said long flux paths and adapted to be excited by input signals so as to establish continuous flux selectively about either of said minor apertures, circuit means including a winding portion passing through each of said minor apertures for reversing flux locally about said apertures, and output circuit means including a winding portion passing through each of said minor apertures and linking said short flux paths thereof in a sense to provide output signals when said device is operated which depend on flux being switched at either of said minor apertures.

6. A magnetic device, including in combination a core of magnetic material having square-loop hysteresis characteristics, said core including two sections merging at a common region with each of said sections defining a major closed flux path, said core having an input minor aperture and an output minor aperture both located wholly in one of said major flux paths and dividing the same into branches, said core further having another input minor aperture and another output minor aperture both located wholly in the other of said major flux paths dividing the same into branches, each said minor aperture defining a minor closed flux path about the same which is shorter than the associated major flux path, input circuit means including winding portions passing through said input minor apertures in opposite directions to link the minor flux paths thereof in an opposed sense, output circuit means including winding portions passing through said output minor apertures in opposite directions to link the minor flux paths thereof in an opposed sense, winding means linking said major flux paths and adapted to establish continuous flux about the same in the operation of said device, and further winding means passing through said output minor apertures and adapted to reverse continuous flux locally about said output minor apertures in the operation of said device.

7. The magnetic device of claim 6 in which said input winding portions and said output winding portions each link only one respective branch of a major flux path at said minor apertures.

8. A magnetic device, comprising a one-piece core of magnetic material having square-loop hysteresis characteristics, said core having a configuration providing first and second major closed flux paths respectively in first and second portions of said core, said core further having an input minor aperture and an output minor aperture both located wholly in said first major flux path and dividing the same into branches, and further having at least an output minor aperture located wholly in said second major flux path dividing the same into branches, each said minor aperture defining a minor closed flux path in the material about the same which is shorter than the associated major flux path, each of said minor apertures being separated from the other minor apertures enough that said minor flux paths have no common branch between them and are, therefore, effectively isolated from each other, blocking circuit means including winding portions linking said major flux paths and adapted to establish continuous flux about the same in the operation of said device, input circuit means including a winding portion threading said input aperture, output circuit means including winding portions threading said output apertures and linking the minor flux paths thereof in a sense to cause voltage cancellation in said output winding portions in the operation of said device, and further circuit means including winding portions passing through said output apertures in a sense to reverse continuous flux locally about the same in the operation of said device.

9. The magnetic device of claim 8 in which said core further includes a second input minor aperture located wholly in said second major flux path dividing the same into branches at second input aperture, with said input circuit means having first and second input winding portions respectively threading said input apertures and separate electrically and physically from each other.

10. A one-piece core of magnetic material having relatively high flux retentivity for use in a magnetic circuit device having energizing windings for said core, said core including two sections each defining a major closed flux path in said magnetic material, said core having an input minor aperture and an output minor aperture both located wholly in one of said major flux paths and positioned at separate points along said one major flux path dividing the same into branches at said minor apertures, and said core having at least an output minor aperture located wholly in the other of said major flux paths dividing the same into branches at the latter minor apertures, said major flux paths having only two operative branches at each of the portions thereof where said minor apertures are located, each of said minor apertures defining a minor closed flux path in the magnetic material about the same which is shorter than the only major flux path associated therewith, and each of said minor apertures being separated from the other said minor apertures such that said minor flux paths have no common branch between them, whereby said minor flux paths are effectively isolated from each other.

11. A one-piece core of magnetic material having relatively high flux retentivity for use in a magnetic circuit device having energizing windings for said core, said core having a configuration providing first and second major closed flux paths respectively in first and second portions of said core, said core having a first input minor aperture and a first output minor aperture both located wholly in said first major flux path and positioned at separate points along said first major flux path, said apertures dividing the same into two branches at each of said first minor apertures, and said core further having a second input minor aperture and a second output minor aperture both located wholly in said second major flux path and positioned at separate points along said second major flux path, said apertures dividing the same into two branches at each of said second minor apertures, said major flux paths having only two branches at each of the portions thereof where said minor apertures are located, each of said minor apertures defining a minor closed flux path in the magnetic material about the same which includes the adjoining branches of the only major flux path associated therewith, and each of said minor apertures being separated from the other said minor apertures such that said minor flux paths have no common branch between them, whereby said minor flux paths are sufficiently isolated from each other to facilitate operation of said core in a logic-type switching mode.

12. A magnetic device, comprising core means of magnetic material having relatively high flux retentivity, said core means including two core sections each having a major aperture therein defining a major closed flux path in the magnetic material, with each said major flux path having at least an output minor aperture located wholly therein dividing the same into branches, and with each said minor aperture defining a minor closed flux path in the magnetic material about the same that is shorter than the only major flux path associated therewith, blocking circuit means including winding means linking said major flux paths and adapted when energized to establish continuous flux about the same, input circuit means independent of said blocking circuit means including winding means linking at least one of said major flux paths and adapted when energized to establish continuous flux about the output minor aperture in the latter major flux path, circuit means including winding means passing through said output minor apertures for reversing flux locally about such apertures in the operation of said device, and output circuit means including output winding means passing through said output minor apertures and linking said minor flux paths thereof in a sense to provide output signals in said output circuit means which depend upon flux that is linked by said output winding means being switched at either of said output minor apertures in the operation of said device.

13. The magnetic device of claim 12 in which said core means consists of a one-piece core having two sections.

14. The magnetic device of claim 12 in which said core means consists of two cores physically separate from each other.

15. A magnetic logic device comprising a one-piece core of magnetic material having square-loop hysteresis characteristics, said core having a first portion with a first major aperture therein and a second portion with a second major aperture therein, said core further having a first closed major flux path surrounding said first major aperture and a second closed major flux path surrounding said second major aperture, said core having an opening therein surrounded by said magnetic material and effectively isolating said first and second major flux paths from each other, said core further having at least two minor apertures located wholly in said first core portion and positioned at separate points along said first major flux path and dividing said first major flux path into branches, at least two further minor apertures located wholly in said second core portion and positioned at separate points along said second major flux path and dividing said second major flux path into branches, each of said minor apertures defining a closed minor flux path individual to and about such minor aperture which is shorter than said first and second major flux paths, each of said minor apertures being separated from the other minor apertures such that said minor flux paths have no common branch therebetween, so that said minor flux paths are effectively isolated from each other.

References Cited by the Examiner

UNITED STATES PATENTS

| | | | |
|---|---|---|---|
| 2,911,630 | 11/59 | Dinowitz | 340—174 |
| 2,983,906 | 5/61 | Crane | 340—174 |
| 3,026,421 | 3/62 | Crane | 340—174 |
| 3,093,817 | 6/63 | Rajchman et al. | 340—174 |

IRVING L. SRAGOW, *Primary Examiner.*